Oct. 23, 1951  A. A. MARKSON  2,572,362
PROCESS OF MAKING PHOSPHATE GLASS COMPOSITIONS
Filed Dec. 12, 1949
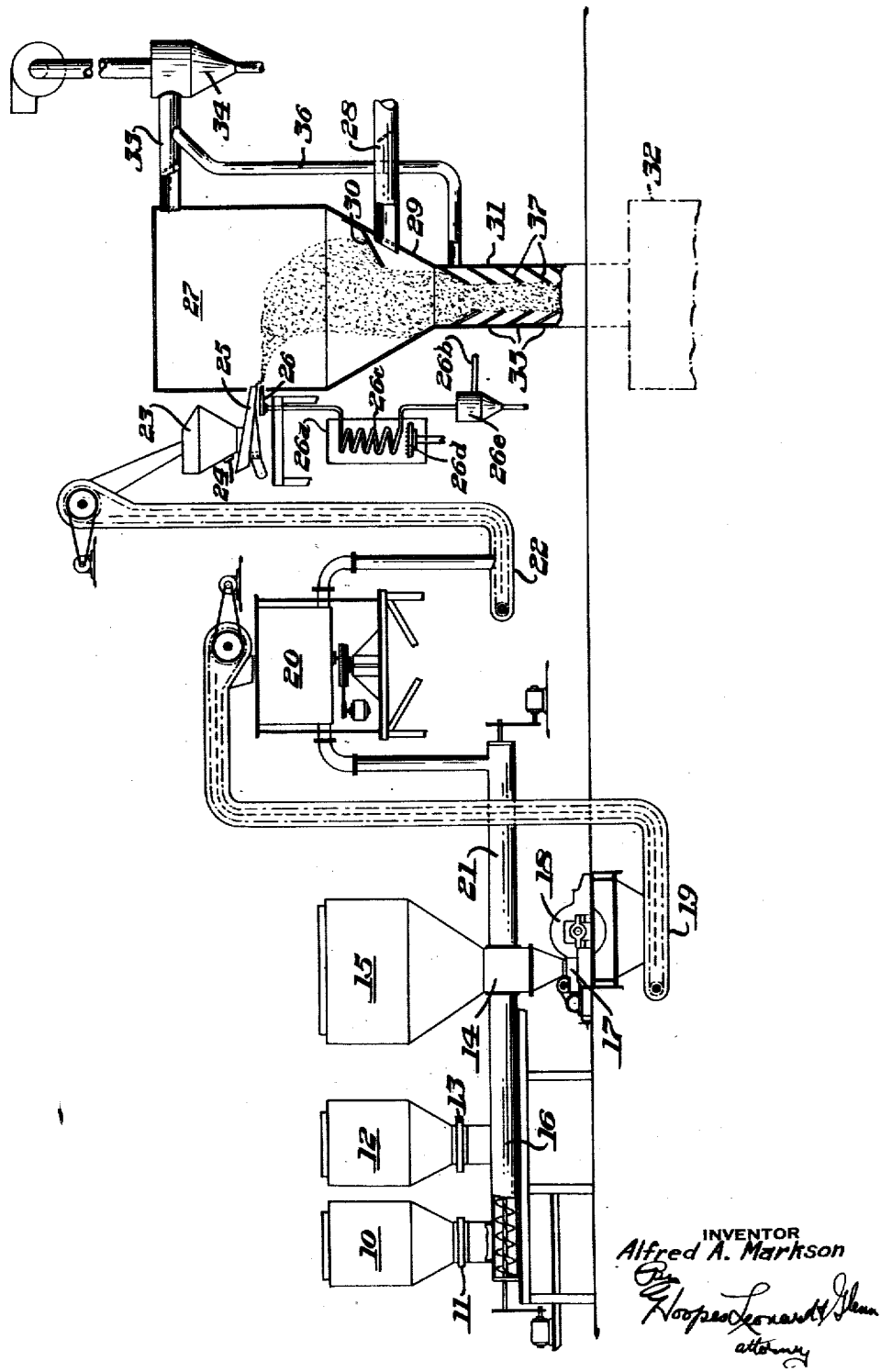
INVENTOR
Alfred A. Markson Patented Oct. 23, 1951

2,572,362

UNITED STATES PATENT OFFICE 2,572,362

PROCESS OF MAKING PHOSPHATE GLASS COMPOSITIONS

Alfred A. Markson, Mount Lebanon Township, Allegheny County, Pa., assignor to Calgon Incorporated, Pittsburgh, Pa., a corporation of Pennsylvania Application December 12, 1949, Serial No. 132,473

4 Claims. (Cl. 252—135)

This invention relates to a process of making phosphate glass compositions and more particularly to a process of producing phosphate glass compositions of controlled density.

Phosphate glasses have come into wide use for water-conditioning and particularly for water softening and detergent mixtures. Phosphate glasses, however, are quite deliquescent and difficult to dissolve. They take up moisture from the air forming a sticky coating on the surfaces of the phosphate glass thereby causing them to adhere in a dense compact mass. Solution of such glassy phosphates in water is slow since the particles tend to cohere into a sticky, mucilaginous mass which is difficult to dissolve.

It has been proposed (application of Robert W. Liddell, Jr., filed December 12, 1949, and bearing Serial No. 132,467) to produce a readily soluble alkali-metal phosphate glass or phosphate glass composition by generally following the steps of maintaining a gaseous humidifying zone, such as a steam jet, and a contiguous gaseous drying zone, dispersing a powdered water-soluble alkalimetal phosphate glass in the humid zone, carrying it through the humid zone, carrying it to and through the drying zone, all the while maintaining it in gaseous suspension whereby the individual particles are first subject to humidifying conditions and thereafter to drying conditions while gas-borne, so that the surfaces of the individual glass particles are first rendered tacky and thereafter rendered essentially non-tacky. It has also been proposed to produce a water-soluble product having as a major constituent the above mentioned water-soluble phosphate glass coated with one or more desired compatible water-soluble ingredients. This is accomplished by substantially simultaneously dispersing the phosphate glass and the desired water soluble ingredient or ingredients in the steam jet and following the steps outlined above.

I have found that a more uniform density can be obtained in following the above described process if the humidifying zone is subjected to certain controls. I have discovered that the density of the product can be uniformly controlled by controlling the degree of superheat of the steam forming the steam jet into which the powdered materials are dispersed. I have found that the density of the product increases as the superheat temperature of the steam increases. For example, by controlling the degree of superheat of the steam jet, and with steam at approximately ½ p. s. i. I am able to produce a product varying in density from about 35 lbs./ft.³ at a steam temperature of about 215° F. to about 60 lbs./ft.³ at a steam temperature of about 450° F.

The process may be carried out in an apparatus the preferred form of which is illustrated in the drawings wherein I have illustrated an apparatus for producing a water-soluble phosphate glass having a molar ratio of alkali metal oxide to phosphorous pentoxide between about 0.9:1 and about 1.7:1 coated with a gas-releasing substance such as described in the copending Liddell application Serial No. 132,467. As shown in the drawing the coating materials are fed from a soda-ash storage bin 10 and proportioner 11 and a sodium bicarbonate storage bin 12 and proportioner 13 to the outlet 14 of a phosphate glass storage bin 15 by a screw conveyor 16. The outlet 14 empties into the screw conveyor 17 of a pulverizer 18 in which the soda-ash, sodium bicarbonate and phosphate glass are mixed and ground together to pass through a 40 mesh or finer screen. The finely ground materials fall onto a chain conveyor 19 which discharges them into a vibrating screen 20 where the oversize particles are separated from the fines and returned to the outlet 14 by a screw conveyor 21. The fine material from the vibrating screen falls onto a chain elevator 22 which carries it to a hopper 23. The hopper 23 is vibrated by an electromagnetic pulsating vibrator 24 of the "Syntron" type which feeds a substantially uniform layer of the powdered material to a vibrating feeder pan 25 such as the "Syntron F-22". The mixture of soda ash, sodium bicarbonate and phosphate glass is fed from the edge of the feeder pan 25 in a film or layer which drops across the path of a jet of steam of controlled temperature issuing from a steam nozzle 26. The temperature of the steam is controlled by a superheater 26a located in the steam line 26b just prior to the steam jet. The superheater consists generally of a coil 26c heated by a gas burner 26d. A cyclone separator 26e preceding the superheater in the steam line removes excess moisture from the steam so that it is essentially dry when entering the superheater. The jet of steam picks up the powdered material and carries it toward the center of a chamber 27 and into a stream of upwardly moving warm air from an air inlet 28 in the hopper bottom 29 of the chamber. As the mixture is carried by the jet of steam and the upwardly moving warm air the particles of phosphate glass appear to first pick up a film of moisture which renders them tacky, the extent of the moisture pick-up and tackiness apparently depending upon the temperature of the jet of steam. While still tacky these particles apparently are either individually coated with the particles of soda ash and sodium bicarbonate or agglomerated as larger particles which are coated with soda ash and sodium bicarbonate and then rendered essentially non-tacky while still gas-borne and while maintaining the discreteness of the individual particles. While these changes in surface condition are occurring the particles are gas-borne but are falling through the chamber 27 toward the hopper bottom 29. In order to prevent the coated particles from obstructing the warm air inlets 28 and to protect the particles themselves from direct impingement by the air stream as it leaves the inlets a baffle 30 is attached to the walls of the chamber 27 and the hopper bottom 29 of the chamber. The coated particles of phosphate glass falling from the air stream are directed by the hopper bottom 29 and baffle 30 into a delivery chute 31 leading to a product storage bin 32 (partially shown in chain lines) from which the coated product may be packaged.

The residual gaseous stream of steam and warm air is carried out of the chamber 27 by an outlet pipe 33 and discharged into the atmosphere through a cyclone separator 34 which removes any particles of the mixture of phosphate glass, etc., carried by the gaseous stream.

The product is cooled before reaching the storage bin 32 by drawing a stream of cooling air through openings 35 in the sides of the delivery chute 31. The cooling air is removed from the top of the delivery chute by an auxiliary outlet pipe 36 branching from the outlet pipe 33 between the chamber 27 and the cyclone separator 34. Baffles 37 are arranged in the delivery chute 31 above the openings 35 to direct the product away from the openings.

A product having the lowest density is produced when the steam is superheated just sufficiently to prevent condensation at the steam nozzle. Such a product will have a weight of about 35 lbs./ft.$^3$. As the temperature of the steam is increased the weight of the resulting product increases; for example, a steam temperature of 375° F. and approximately ½ p. s. i. will give a product weighing about 50 lbs./ft.$^3$, a steam temperature of 400° F. and the same steam pressure gives a product weighing about 55 lbs./ft.$^3$ and a steam temperature of 450° F. and the same steam pressure gives a product weight about 60 lbs./ft.$^3$. The superheat temperature at 450° F. is about 240° F. Steam superheats above 240° F. will yield even greater product weights.

The product resulting from high superheat temperatures is not as agglomerated as that resulting from lower superheat temperature. In general, the higher the superheat, the pulverulent the product.

The regular increase in density produced by increasing the superheat is illustrated by the results of laboratory production given in table. Low pressure steam of less than 1 p. s. i. was used here also.

Table

| Steam Temperature | Density of Product |
|---|---|
| ° C. | Gm. cc. |
| 110 | 0.41 |
| 121 | 0.43 |
| 130 | 0.47 |
| 147 | 0.50 |
| 190 | 0.53 |

The density of the product is affected by the temperature of the powdered material which is fed into the steam jet. If the temperature of the raw materials is increased, the result is as if there were an increase in the degree of superheat and a product having a greater density is produced.

While other conditions such as the rate of feed into the steam jet, the particle size of the raw materials, etc., will affect the density of the product, it is possible, under any given set of conditions, to control the density of the product by controlling the temperature of the steam according to my invention. It is at once apparent that the optimum steam temperature for producing a given density can readily be determined in practice for any such set of conditions.

As illustrative of some of the compositions both water softening and detergent which may be produced by my process, I cite the following examples:

*Example I*

94% sodium phosphate glass
6% soda carbonate

*Example II*

84% sodium phosphate glass
11% sodium bicarbonate
5% soda carbonate

*Example III*

80% sodium phosphate glass
10% sodium bicarbonate
10% soda carbonate

*Example IV*

84% sodium phosphate glass
8% sodium bicarbonate
8% soda carbonate

*Example V*

75% sodium phosphate glass
5% soda carbonate
20% sodium tripolyphosphate

*Example VI*

40% sodium phosphate glass
40% sodium metasilicate
10% disodium phosphate
10% sodium carbonate

*Example VII*

30% sodium phosphate glass
30% soda carbonate
30% sodium metasilicate
10% disodium phosphate To these or various other mixtures may be added any of the commonly used wetting agents such as the alkyl sulfonates, the alkyl aryl sulfonates, polyalkoxyalkyl phenols, etc., or any of the common antifoaming agents such as trioctyl phopshate, zinc stearate, mineral oils, etc. Soaps may also be used in place of or in combination with the non-soap type of detergents illustrated in the examples.

While sodium phosphate glasses are preferred in my process, other alkali metal phosphate glasses may be employed, such as those of potassium, lithium, rubidium and ammonium or mixtures of them. These phosphate glasses may contain the usual impurities in ordinary amounts. As has already been pointed out many water soluble ingredients may be added to the phosphate glass by following my process or a phosphate glass having only a hydration product upon its surfaces may be produced. Accordingly it will be understood that while I have illustrated and described a preferred practice of my invention it may be otherwise embodied within the scope of the following claims.

I claim:

1. In a process of making a finely divided water-soluble material having as its basic constituents a major proportion of a water-soluble alkali-metal phosphate glass having a molar ratio of alkali-metal oxide to phosphorus pentoxide between about 0.9:1 and about 1.7:1 and a desired compatible water-soluble ingredient, which comprises feeding the phosphate glass and the minor ingredient to a jet of steam transferring them to a gaseous drying zone, whereby the individual particles are first subjected to humidifying conditions and thereafter to drying conditions while gas-borne, so that the surfaces of the individual glass particles are first rendered tacky and coated with the desired ingredient and thereafter rendered essentially non-tacky while retaining the coating of desired ingredient and while agglomeration of the particles into large dense masses is avoided, and then collecting the product as a loose friable, finely divided mass, the improvement comprising the step of controlling the bulk density of the resulting product by controlling the degree of superheat of the steam forming the steam jet.

2. In a process of making a finely divided water-soluble material having as its basic constituents a major proportion of a water-soluble alkali-metal phosphate glass having a molar ratio of alkali-metal oxide to phosphorus pentoxide between about 0.9:1 and about 1.7:1 and a powdered, solid water-soluble alkali-metal compound which releases a gas when reacted in water solution with said phosphate glass which comprises feeding the phosphate glass and the gas-releasing compound into a jet of steam, trans.erring them to a gaseous drying zone, whereby the individual particles are first subjected to humidifying conditions and thereafter to drying conditions while gas-borne, so that the surfaces of the individual glass particles are first rendered tacky and coated with the gas-releasing compound and thereafter rendered essentially non-tacky while retaining the coating of the gas-releasing compound and while agglomeration of the particles into large dense masses is avoided, and then collecting the product as a loose friable, finely divided mass, the improvement comprising the step of controlling the density of the product by controlling the degree of superheat of the steam forming the steam jet.

3. In a process of making a finely divided water-soluble material having as its basic constituents a major proportion of a water-soluble alkali-metal phosphate glass having a molar ratio of alkali-metal oxide to phosphorus pentoxide between about 0.9:1 and about 1.7:1 and a desired compatible water-soluble ingredient, which comprises feeding the phosphate glass and the minor ingredient to a jet of steam transferring them to a gaseous drying zone, whereby the individual particles are first subjected to humidifying conditions and thereafter to drying conditions while gas-borne, so that the surfaces of the individual glass particles are first rendered tacky and coated with the desired ingredient and thereafter rendered essentially non-tacky while retaining the coating of desired ingredient and while agglomeration of the particles into large dense masses is avoided, and then collecting the product as a loose friable, finely divided mass, the improvement comprising the step of controlling the density of the product by controlling the superheat of the steam between about 0° F. and 250° F.

4. In a process of making a finely divided water-soluble material having as its basic constituents a major proportion of a water-soluble alkali-metal phosphate glass having a molar ratio of alkali-metal oxide to phosphorus pentoxide between about 0.9:1 and about 1.7:1 and a desired compatible water-soluble ingredient, which comprises feeding the phosphate glass and the minor ingredient to a jet of steam transferring them to a gaseous drying zone, whereby the individual particles are first subjected to humidifying conditions and thereafter to drying conditions while gas-borne, so that the sur aces of the individual glass particles are first rendered tacky and coated with the desired in redient and thereafter rendered essentially non-tacky while retaining the coating of desired ingredient and while agglomeration of the particles into large dense masses is avoided, and then collecting the product as a loose friable, finely divided mass, the improvement comprising th st p of controlling the superheat of the steam whereby the density of the resulting product is varied by about 35 lbs./ft.$^3$ and 60 lbs./ft.$^3$.

ALFRED A. MARKSON.

REFERENCES CITED

The following references are of record in the file of this patent:

UNITED STATES PATENTS

| Number | Name | Date |
|---|---|---|
| 2,494,828 | Munter | Jan. 17, 1950 |

Certificate of Correction

Patent No. 2,572,362                                              October 23, 1951

ALFRED A. MARKSON

It is hereby certified that error appears in the printed specification of the above numbered patent requiring correction as follows:

Column 3, line 55, after "the", third occurrence, insert *more*; line 59, before "table" insert *the*; column 6, line 35, for "sur aces" read *surfaces*;

and that the said Letters Patent should be read as corrected above, so that the same may conform to the record of the case in the Patent Office.

Signed and sealed this 12th day of February, A. D. 1952.

[SEAL]

THOMAS F. MURPHY,
                                                           *Assistant Commissioner of Patents.*